Oct. 27, 1925.
M. R. PLASTINO
ELECTRIC HEATER
Filed July 21, 1924
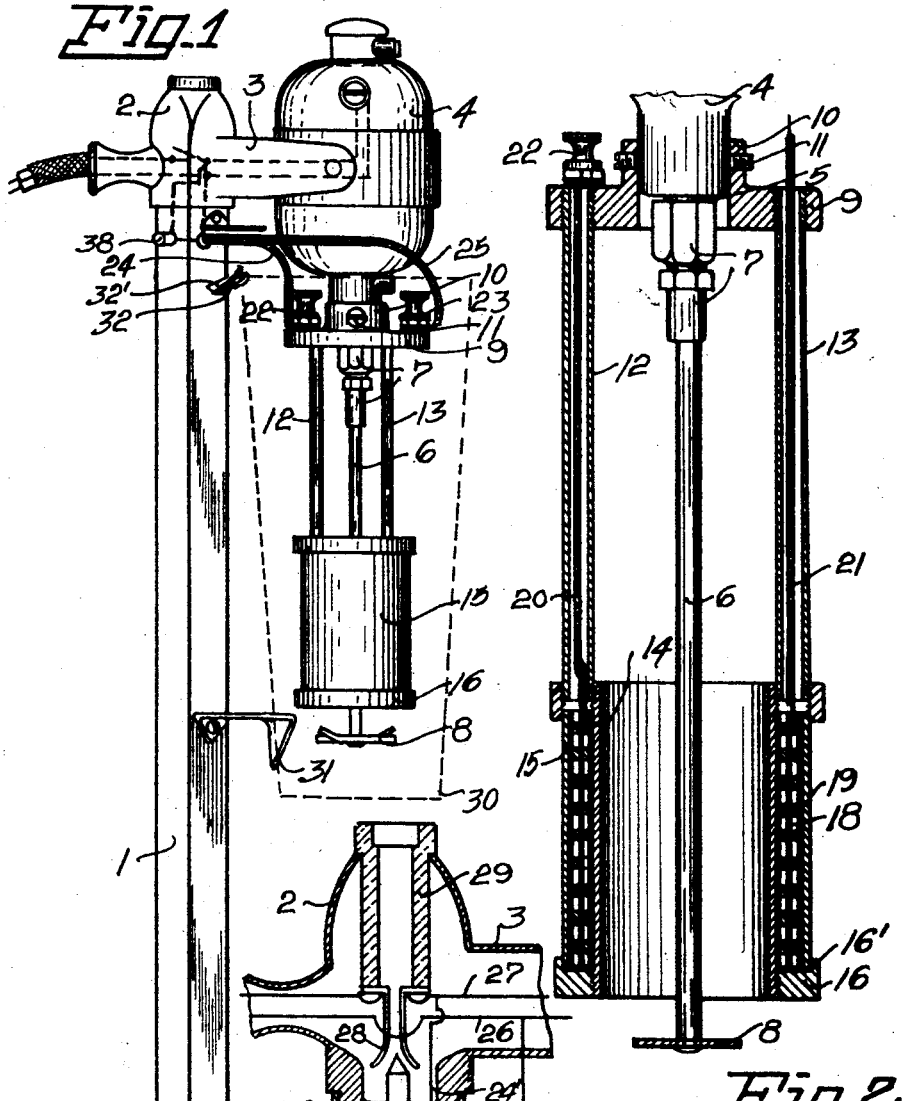
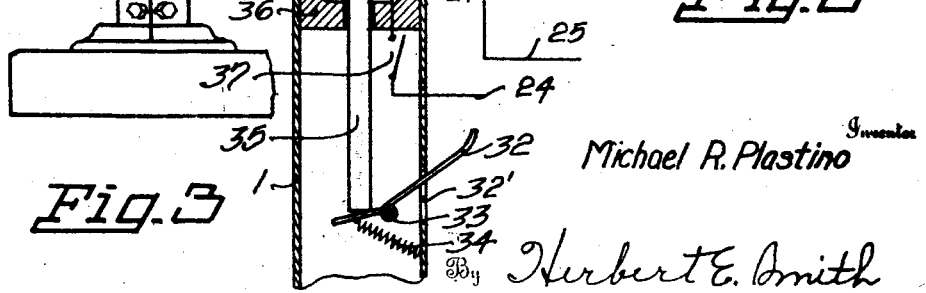
Inventor
Michael R. Plastino
By Herbert E. Smith
Attorney Patented Oct. 27, 1925.

1,559,002

UNITED STATES PATENT OFFICE.

MICHAEL R. PLASTINO, OF SPOKANE, WASHINGTON.

ELECTRIC HEATER.

Application filed July 21, 1924. Serial No. 727,294.

*To all whom it may concern:*

Be it known that I, MICHAEL R. PLASTINO, a citizen of the United States, residing at Spokane, in the county of Spokane and State of Washington, have invented certain new and useful Improvements in Electric Heaters, of which the following is a specification.

My present invention relates to improvements in electric heaters particularly as applied to motor operated mixing devices for use at soda fountains and other places where beverages and drinks are prepared and dispensed.

The primary object of the invention is the provision of a combined mixer and heater in which the mixer is operated by an electric motor and the heater is energized by electric current, the mixer and heater both being controlled in order that they may be simultaneously effective. By the utilization of my invention the beverage may be mixed at the same time that it is heated, a very desirable condition in the preparation of some hot drinks for dispensing at a fountain or similar place.

For accomplishing this purpose the electric heater is combined with the mixing or agitating device for simultaneous immersion in the beverage contained in a glass or other container, and the heater is energized from the motor circuit of the mixing device.

The motor circuit is automatically controlled by the weight of the glass or container when in proper position, and means are provided for cutting out the heater circuit when desired.

The invention consists in certain novel combinations and arrangements of parts as will be hereinafter more fully pointed out and claimed.

In the accompanying drawings I have illustrated one complete example of the physical embodiment of my invention wherein the parts are combined with a well known type of soda fountain appliance, and according to the best mode I have thus far devised for the practical application of the principles of my invention.

Figure 1 is a view in side elevation of a motor operated mixing or agitating device for beverages with which my electric heater is combined.

Figure 2 is an enlarged detail, vertical sectional view of the combined heater and mixer.

Figure 3 is an enlarged detail, sectional view at the top of the post or pedestal showing the electric switches for the motor and heater.

In Figure 1 of the drawings a well known type of mixing apparatus is illustrated with its hollow pedestal or post 1 which is usually affixed to some convenient support at the soda fountain or other place. The hollow post is provided with a hollow head 2 and lateral arms 3 in which the motor 4 is supported in usual manner. The motor is provided with a shaft 5 and the spindle 6 of the mixing device which is alined with the shaft and depends from the motor is connected to the shaft by transmission supports 7. At its lower end the spindle 6 is provided with a mixing or agitating blade 8 which when immersed in the beverage and rotated from the motor through the shaft and spindle, produces the required mixture for the beverage.

The electric heating attachment of my invention is suspended from the electric motor through the instrumentality of a supporting disk 9, circular in shape and provided with an attaching collar or sleeve 10 that is secured to the motor by means of set screws 11. The disk forms a support for two diametrically arranged hollow bars 12 and 13 spaced at the sides of the central spindle 6 and fixed at their upper ends, as by screw threads to the disk 9 which is perforated for the purpose. The disk and two supporting bars 12 and 13 thus form a rigid, fixed frame in connection with the stationary motor for suspending and supporting the electric heating element which also is rigidly held to the two bars 12 and 13.

The electric heating element is a tubular structure located in proximity to the mixing device and surrounding the spindle 6 at its lower end. The heating element comprises an inner cylindrical shell 14 and an outer, spaced, cylindrical casing 15 which members are joined at their lower ends by a base ring 16 having an annular flange 16' to receive the outer casing, and has internal threads for the lower threaded end of the inner shell.

Between the spaced inner shell and outer casing an annular chamber 18 is formed in which is contained the resistance wires or heating element 19. The heat generated from the annular heating element is radiated through both the inner shell and the outer casing and by this arrangement of parts a maximum heating area is secured for the heater when immersed in the beverage.

The heating element is provided with electric wires 20 and 21 introduced thereto through the hollow supporting bars 12 and 13, and these wires are connected to the terminal posts 23 and 24 which are suitably insulated and secured to the supporting disk 9.

Lead wires 24 and 25 for the complementary wires 20 and 21 are also connected to these terminals and they are passed through slots in the upper end of the pedestal and connected to the motor circuit wires 26 and 27. Current is carried from a suitable source of supply for the operation of the motor and the electric current for the heater is drawn by way of branch wires 24' and 24 and wire 25 from the motor circuit.

In Figure 3 a single, automatic control switch is illustrated for the mixer and heater which includes the fixed blades or contact points 28 supported from the fixture 29 secured in the head 2 of the pedestal 1. The switch is normally open, but is automatically closed when the glass or container 30 shown in dotted lines Figure 1, is placed in position against a supporting brace or bracket 31 and suspended from a movable hook 32. This suspending hook for the glass projects through a slot 32' in the wall of the hollow pedestal and within the pedestal it is pivoted at 33 on a suitable support rigid with the pedestal. A spring 34 attached to one arm of the lever and anchored to the interior face of the hollow pedestal, holds the free end or hooked, exterior, end of the lever in elevated, normal position. When the glass or container is suspended from the outer end of the lever, the weight of the container and its contents pulls down on the outer arm of the lever and lifts the inner arm against tension of the spring 34. As the inner arm of the lever is elevated it lifts the conductor pin or plunger rod 35 which is supported to reciprocate in a centrally perforated, horizontal disk 36 within the head 2.

When the movable contact member 35 is pushed between the stationary members 28 the motor controlling switch is closed and the motor is operated to actuate the mixing device. Closing the motor switch also energizes the heating circuit and as long as the container is suspended on its hook the motor is operated and the heater energized. In this manner the beverage is mixed and heated simultaneously as it will be apparent that the mixer and heater are immersed or submerged within the beverage.

After a predetermined period during which the beverage is thoroughly mixed and simultaneously heated, the glass or container 30 is lifted from its support 32 and withdrawn from the combined heater and mixer. When the weight is released from the lever 32, spring 34 pulls the lever to normal inoperative position and the movable contact member 35 of the motor switch falls by gravity away from the stationary members, thus breaking the circuit, stopping the motor and de-energizing the heater.

Between the wires 24 and 24' and within the pedestal is provided a normally closed cut out switch 37 for the heater. This switch is actuated in usual manner by a slide button 38 accessible at the exterior of the pedestal for the purpose of cutting out the heater if it is desired to operate the motor and mixing device without the heater.

Because of its large heating area for the radiation of heat the heater is efficient for rapidly heating the beverage, and due to its construction in annular form the heater affords the required space for circulation of the beverage as it is being mixed in contact with the radiating walls of the heater.

Having thus fully described my invention, what I claim as new and desire to secure by Letters Patent is—

1. The combination with an electric motor and mixing device operated thereby, of a vessel and a removable electric heater submerged in the contents of the vessel, an electric circuit for the motor and an electric circuit for the heater, and a control switch effective for both said circuits.

2. The combination with an electric motor and its operating circuit and a mixing device actuated by said motor, of a vessel, a removable electric heater submerged in the contents of the vessel, a heating circuit connected with the motor circuit, and an automatic control switch for said motor circuit.

3. The combination with an electric motor and its operating circuit and a mixing device actuated by said motor, of a vessel, a removable electric heater submerged in the contents of the vessel having an electric circuit connected with the motor circuit, an automatic control switch for said motor circuit, and a normally closed cut-out switch in the heater circuit.

4. The combination with a mixing device and its actuating motor, of a vessel, and a heating attachment comprising means for attachment to the motor, a removable heating element in the vessel supported from said attachment in proximity to the mixing device, electric connections for operating the motor and energizing the heating element, and means for controlling said electric connections.

5. The combination with a motor and mixing device comprising a rotary spindle and mixing blade, of a tubular heating device surrounding the spindle, means for supporting said device from the motor, and electric connections for operating the motor and energizing the heating device.

6. An electric heating attachment comprising an attaching disk and supporting bars depending therefrom, a tubular heating device having an annular interior space, and a heating element located in said annular space.

7. An electric heating attachment comprising an attaching member and supporting bars depending therefrom, a heating device comprising an inner shell and an outer casing forming an interior annular space, and a heating element located in said annular space.

8. The combination with a support of an attaching disk and means for securing it to said support, a pair of tubular supporting bars depending from the disk, a heating device supported from said bars and comprising an inner shell and an outer casing forming an interior annular space, a heating element located in said space, and electric wires passed through said tubular bars to the heating element.

9. The combination with a motor and mixing device including a spindle and mixing blade, of a supporting disk and means for attaching it to the motor, a pair of tubular supporting bars secured to the disk, a heating device supported from said bars and comprising an inner shell an outer casing and an intermediate heating element, and electric wires passed through said tubular bars to the heating element.

10. A heating attachment comprising an inner shell and an outer casing forming an annular interior space, end rings secured to said shell and casing and closing the ends of the space, a heating element within the space, tubular supporting bars attached to one of said rings, an attaching member supported on said bars, and electric wires passed through said tubular bars to the heating element.

In testimony whereof I affix my signature.

MICHAEL R. PLASTINO.